(12) United States Patent
Galan

(10) Patent No.: US 11,688,180 B2
(45) Date of Patent: Jun. 27, 2023

(54) LANE DEPARTURE WARNING WITHOUT LANE LINES

(71) Applicant: Continental Automotive Systems, Inc., Auburn Hills, MI (US)

(72) Inventor: Roberto Guzman Galan, Tlaquepaque (MX)

(73) Assignee: Continental Autonomous Mobility US, LLC, Auburn Hills, MI (US)

( * ) Notice: Subject to any disclaimer, the term of this patent is extended or adjusted under 35 U.S.C. 154(b) by 329 days.

(21) Appl. No.: 16/891,929

(22) Filed: Jun. 3, 2020

(65) Prior Publication Data

US 2021/0383135 A1   Dec. 9, 2021

(51) Int. Cl.
| | |
|---|---|
| *B60Q 1/00* | (2006.01) |
| *G06V 20/56* | (2022.01) |
| *G08G 1/16* | (2006.01) |
| *B60Q 9/00* | (2006.01) |
| *G06V 20/64* | (2022.01) |
| *B60W 50/14* | (2020.01) |
| *B60W 30/12* | (2020.01) |

(Continued)

(52) U.S. Cl.
CPC ............ *G06V 20/588* (2022.01); *B60Q 9/008* (2013.01); *G06V 20/647* (2022.01); *G08G 1/167* (2013.01); *B60W 30/12* (2013.01); *B60W 50/16* (2013.01); *B60W 60/001* (2020.02); *B60W 2050/143* (2013.01); *B60W 2050/146* (2013.01); *B60W 2420/42* (2013.01)

(58) Field of Classification Search
CPC .... G06V 20/588; G06V 20/647; G06V 20/58; B60Q 9/008; G08G 1/167; B60W 30/12; B60W 50/16; B60W 60/001; B60W 2050/143; B60W 2050/146; B60W 2420/42; B60W 2552/53
See application file for complete search history.

(56) References Cited

U.S. PATENT DOCUMENTS

| | | | |
|---|---|---|---|
| 9,406,232 B2 * | 8/2016 | Kataoka | ............... G06V 20/588 |
| 2010/0238283 A1 | 9/2010 | Kim | |
| 2011/0301813 A1 | 12/2011 | Arms | |

(Continued)

FOREIGN PATENT DOCUMENTS

| | | |
|---|---|---|
| CN | 105922991 A | 9/2016 |
| JP | 2015005132 A | 1/2015 |

(Continued)

*Primary Examiner* — Toan N Pham

(57) ABSTRACT

A lane departure warning system which uses at least one detection device, such as a stereo camera, to map the surrounding environment in three-dimensions, which provides for a determination of the distance of various objects in a given image obtained by the camera. With the information obtained by the camera, or cameras, additional data, such as the color of each pixel in an image, it is possible to identify which pixels in the image correspond to the road. Once the pixels that correspond to the road are identified, the width of the road is determined, as well as the position of the vehicle on the road. With the width of the road being known, the road is "virtually" divided into virtual lanes, and it is determined which of the virtual lanes the vehicle is travelling, and the vehicle is monitored to ensure that the vehicle remains within one of the virtual lanes.

19 Claims, 3 Drawing Sheets

(51) Int. Cl.
*B60W 50/16* (2020.01)
*B60W 60/00* (2020.01)

(56) References Cited

U.S. PATENT DOCUMENTS

| | | | |
|---|---|---|---|
| 2012/0212612 A1* | 8/2012 | Imai | G06V 20/588 |
| | | | 348/148 |
| 2013/0321630 A1 | 12/2013 | Shin | |
| 2016/0325682 A1* | 11/2016 | Gupta | B60R 1/00 |
| 2017/0043772 A1 | 2/2017 | Watanabe | |

FOREIGN PATENT DOCUMENTS

| | | |
|---|---|---|
| KR | 20090064946 A | 6/2009 |
| KR | 20150019083 | 2/2015 |

* cited by examiner

LANE DEPARTURE WARNING WITHOUT LANE LINES

FIELD OF THE INVENTION

The invention relates generally to a lane departure warning system which is able to infer the lane in which a vehicle is travelling when there are no marked lanes, or poorly marked roads.

BACKGROUND OF THE INVENTION

Lane departure warning (LDW) systems or lane keep assist (LKA) systems are well known. LDW/LKA systems are typically designed to warn a driver when the vehicle is moving or drifting from a lane as the vehicle is being driven on a road or a roadway. These types of systems typically include a detection device, such as a camera, or sensor, which is able to detect one or more division lines used as markers to provide an indication of the different lanes. These systems also include an output device which alerts the driver of the vehicle that the vehicle is close to the edge of a lane, or has departed from a lane.

However, these types of systems are limited in the fact that they rely on some type of marker or line which is located between and divides the lanes. These types of systems typically use a monocular vision camera to map the surrounding environment. In developed countries, most roads and highways are properly marked or signaled. In developing countries, some roads and highways are not always properly marked, or do not have any type of lane markers, which limits the use of LDW/LKA systems, such as an LDW/LKA system which incorporates the use of a monocular vision camera.

Accordingly, there exists a need for an LDW/LKA system which is able to function without the use of lane markers or lines.

SUMMARY OF THE INVENTION

The present invention is a lane departure warning system which uses at least one detection device, such as a camera with stereo vision, to map the surrounding environment in three-dimensions, which provides for a determination of the distance of various objects in a given image obtained by the camera. With the information obtained by the camera, or cameras, additional data, approaches such as "V-Disparity" may be used to determine which pixels corresponding to different objects, to therefore determine which pixels in the image correspond to the road.

Once the pixels that correspond to the road are identified, the width of the road is able to be determined, and the position of the vehicle on the road is able to be determined as well. With the width of the road being known, the road is "virtually" divided into virtual lanes, and it is determined which of the virtual lanes the vehicle is travelling, and the vehicle is monitored to ensure that the vehicle remains within one of the virtual lanes.

In one embodiment, the road may be divided into the virtual lanes using standard lane widths, and the current position of the vehicle within the road is changed or maintained such that the vehicle remains traveling in one of the virtual lanes.

Estimation of the location of the vehicle may be improved if other sources of data to generate the location of the vehicle are available, such as a global positioning system (GPS) and other nearby vehicles. The system may also benefit from partial lane markers, but they are not necessary.

In other embodiments, in addition to the camera or cameras, the location of the vehicle on the road may also be detected using the location of curbs or barriers using radar, a sensor, or some other type of detection device.

In an embodiment, the present invention is a lane departure system, including at least one detection device mounted to a vehicle, where the detection device detects objects in the environment around the vehicle, and the width of a road. The lane departure system also includes a control device in electrical communication with the detection device, a warning device in electrical communication with the control device, at least one virtual lane boundary generated by the control device as a result of information received by the at least one detection device and the width of the road, and at least one virtual lane located adjacent the virtual lane boundary. The vehicle traverses the virtual lane, and the control device commands the warning device to generate a warning when the detection device has detected that the vehicle had moved within a proximity limit of the virtual lane boundary.

In an embodiment, the control device is an autonomous driving vehicle controller.

In an embodiment, there is a plurality of virtual lane boundaries. A first of the virtual lane boundaries is located on one side of the virtual lane, and a second of the virtual lane boundaries is located on the opposite side of the virtual lane as the first of the virtual lane boundaries.

In an embodiment, there is a plurality of virtual lanes. A first of the virtual lanes is disposed on one side of the virtual lane boundary, and a second of the virtual lanes is disposed on the opposite side of the virtual lane boundary as the first of the virtual lanes.

The warning device may generate a warning being at least one of a haptic, a visual, or an audible warning.

In an embodiment, the lane departure system includes a proximity limit, wherein the proximity limit is a predefined distance away from the virtual lane boundary.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
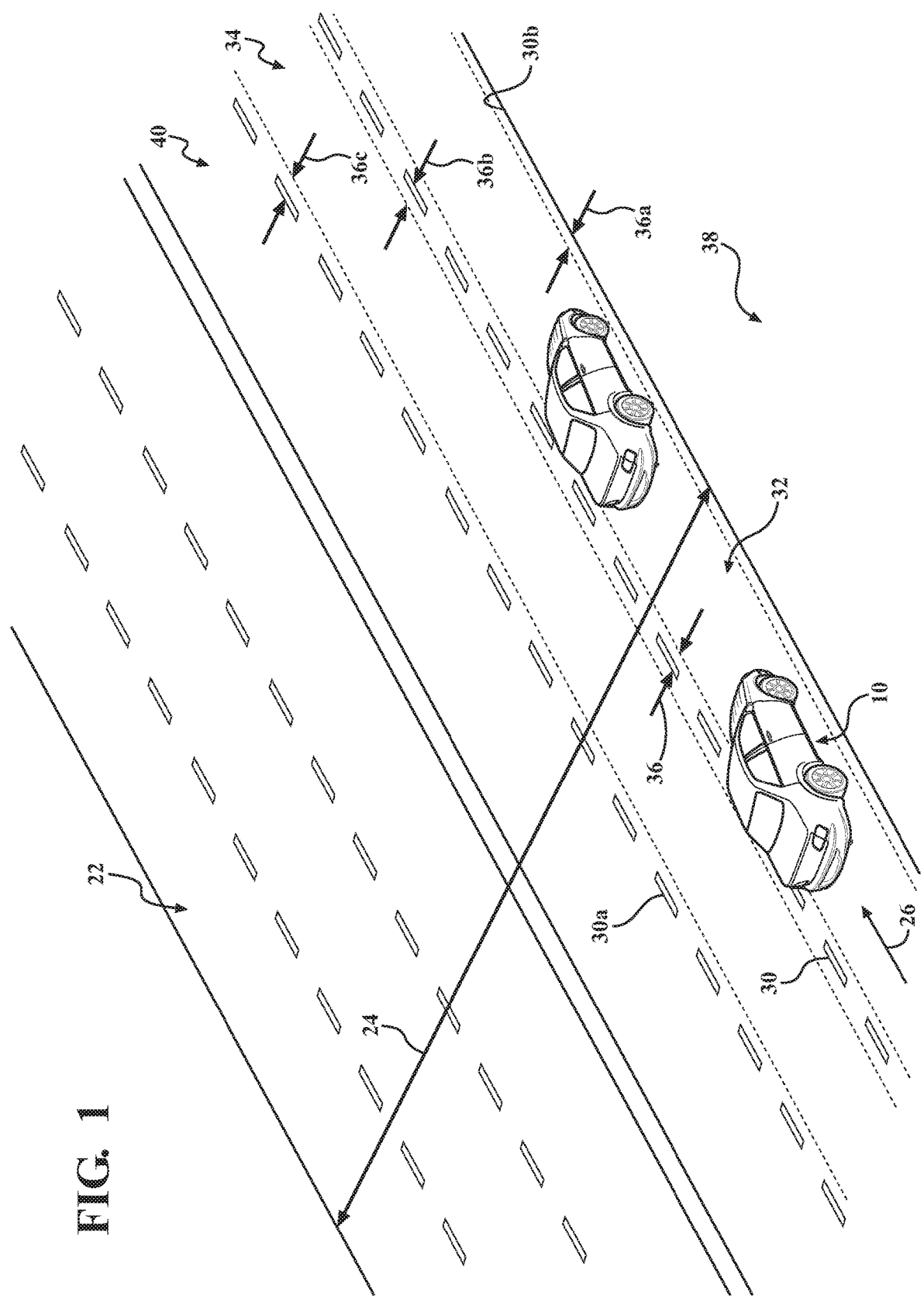
FIG. 1 is a diagram of a vehicle travelling down a road having a lane departure warning system, according to embodiments of the present invention.
Figure 2:
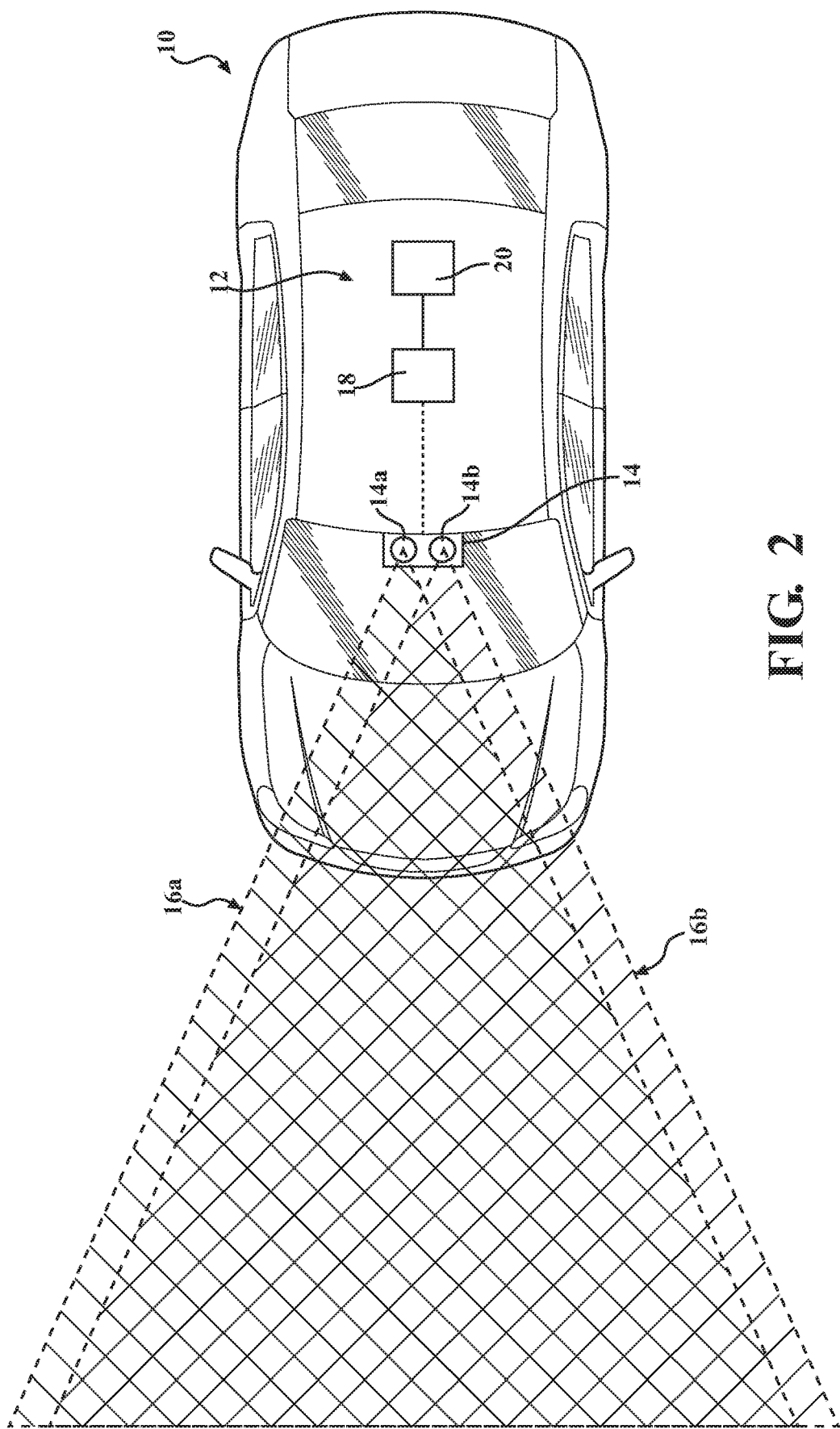
FIG. 2 is a top view of a vehicle having a lane departure warning system, according to embodiments of the present invention.

In some embodiments, the present invention is a lane departure warning system which is able to be used without defined lanes or lane markers. A vehicle having a lane departure warning system is shown in FIGS. 1-2 generally at 10. The lane departure warning system, shown generally at 12, includes at least one camera, which in this embodiment is a stereo camera 14. The stereo camera 14 includes a first image sensor 14a and a second image sensor 14b used to generate an image pair. Although two image sensors 14a, 14b are used, it is within the scope of the invention that additional image sensors may be used to generate multiple images which provide information regarding the surrounding environment. The invention is not limited for use with a stereo camera, it is within the scope of the invention that other types of cameras or sensors may be used to generate one or more images or data to obtain information in three dimensions of a surrounding environment. Each image sensor 14a, 14b is operable for providing information regarding objects in a corresponding detection area. Each detection area for each image sensor 14a, 14b is shown in FIG. 2. More specifically, the first image sensor 14a of the camera 14 is able to obtain information regarding objects in a first detection area 16a, and the second image sensor 14b of the camera 14 is able to obtain information regarding objects in a second detection area 16b. The image sensors 14a, 14b constitute a stereo pair, which is operable for providing three-dimensional information regarding objects that appear in both detection areas 16a and 16b.

The camera 14 is in electrical communication with a control device 18. The control device 18 may be any suitable device which is able to process information received from the camera 14, and make corresponding changes to the movement and direction of the vehicle 10 based on information received from the camera 14.

In an embodiment, the control device 18 is a vehicle controller which is able to provide feedback to the driver of the vehicle 10 as to whether the vehicle 10 is moving in an undesirable manner. The control device 18 is in electrical communication with a warning device 20. The warning device 20 is able to provide a warning signal to the driver of the vehicle 10 when the vehicle 10 is moving in an undesirable manner. This warning may be a visual signal, an audible signal, a haptic signal, or a combination thereof.

The vehicle 10 is shown traveling down a road, shown generally at 22. The road 22 shown in FIG. 1 does not have any lane markers, or any dashed lines or solid lines to distinguish between lanes. The lane departure warning system 12 is able to generate at least one "virtual lane boundary" based on the width of the road 22, the direction of travel of the vehicle 10, and objects in the detection areas 16a, 16b.

Objects in the detection areas 16a, 16b are detected by the image sensor 14a, 14b of the camera 14, the camera 14 is also able to detect the width 24 of the road 22. Based on the width 24 of the road 22, the direction of travel 26 of the vehicle 10, and any objects detected in the detection areas 16a, 16b, the control module 18 is able to provide feedback to the driver of the vehicle 10 regarding whether the vehicle 10 is moving in an undesirable manner.

Figure 3:
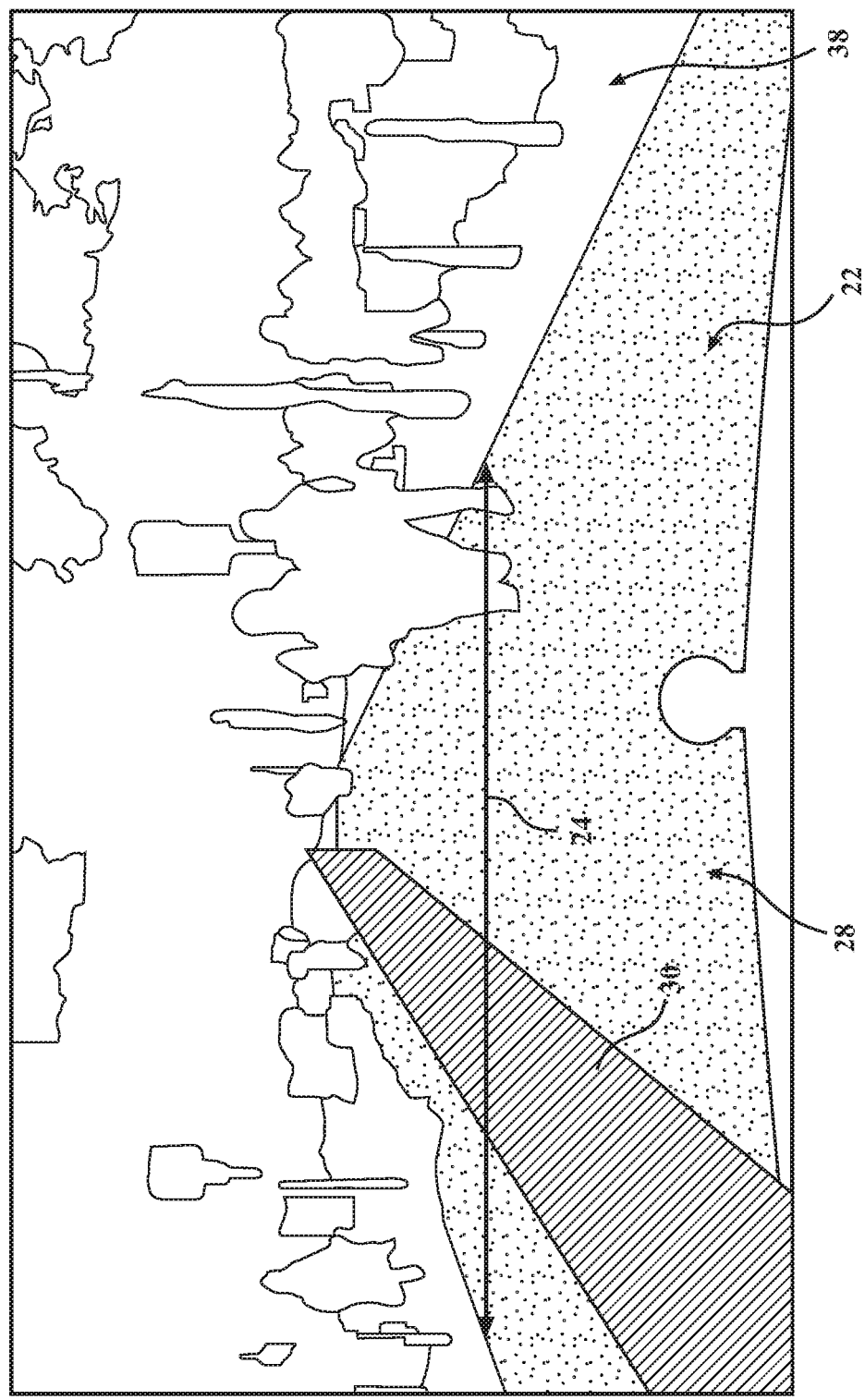
FIG. 3 is an image generated by at least one detection device that is part of a lane departure warning system, according to embodiments of the present invention.

In an embodiment, the image sensors 14a, 14b of the camera 14 are used to generate an image, shown generally at 28 in FIG. 3. The width 24 of the road 22 is determined by identifying which pixels in the image 28 correspond to the road 22. As previously mentioned, the camera 14 is a stereo camera, and may have multiple image sensors. Furthermore, the camera 14 having multiple image sensors may be able to detect objects in multiple detection areas having different shapes and sizes. This would allow the camera 14 to detect roads of varying widths. In one embodiment, the camera 14 may have a number of image sensors such that the camera 14 is able to detect a two lane road, and in other embodiments, the camera 14 has a number of image sensors such that the camera 14 is able to detect roads with two or three lanes (or more) in each direction. The vehicle 10 may also be equipped with additional cameras to accomplish this.

Not only the width 24 of the road 22 but the location of the vehicle 10 within the road 22 may be determined as well once the pixels corresponding to the road 22 are identified. Additionally, once the pixels corresponding to the road 22 are identified, the road 22 is virtually divided (based on the information received by the camera 14) by the control device 18. In FIG. 3, there is a virtual lane boundary 30 which virtually divides the road 22 into two lanes, such that the location of the lanes may be inferred. The road 22 may have all vehicles moving in the same direction, or may have vehicles moving in opposite directions.

Additionally, as shown in FIG. 1, the road 22 may be wide enough such that multiple vehicles may be able to travel in the same direction while being next to one another. In this situation, an additional virtual lane boundary 30a may be generated by the control device 18, shown in FIG. 1, so as to correspond to the road 22 having multiple virtual lanes, shown generally at 32,34,40 where more than one vehicle is able to travel in the same direction, while being adjacent to one another. Furthermore, another virtual lane boundary 30b may also be generated to provide an indication of the location of the edge of the road 22, therefore dividing one of the virtual lanes (which is the virtual lane 32 in FIG. 1) and a shoulder area, shown generally at 38. Additional virtual lanes may be generated as necessary based on the width 24 of the road 22.

Another function of the lane departure warning system 12 is that the control device 18 is also able to generate the virtual lane boundaries 30,30a,30b to facilitate the vehicle 10 remaining in the right-most lane, which in FIG. 1 is the right-most virtual lane 32. The vehicle 10 remaining in the right-most virtual lane 32 (when looking at FIG. 1) may be the safest because the vehicle 10 would be the furthest away from oncoming traffic (if traffic were moving in opposite directions), or the furthest away from other vehicles travelling in the same direction (if the entire road 22 was a one-way road, and multiple vehicles could be travelling adjacent to one another). The right-most virtual lane 32 may also provide for access to an exit ramp, if the road 22 is a highway.

During the travel of the vehicle 10, the direction of the vehicle 10 may be maintained by determining how close the vehicle 10 is to the virtual lane boundary 30. A proximity limit is set such that if the vehicle 10 is moving in an undesirable manner and comes too close to the virtual lane boundary 30, or breaches the proximity limit, the control device 18 commands the warning device 20 to generate a warning to notify the driver of the vehicle 10 that the vehicle 10 is too close to, or has breached, the virtual lane boundary 30. The proximity limit may be a predefined distance 36 away from the virtual lane boundary 30. In one embodiment, the distance 36 of the proximity limit is six inches, but this distance 36 may be more or less, depending on how the lane departure warning system 12 is configured. In another embodiment, the distance 36 may be zero inches, and the control device 18 commands the warning device 20 to generate a warning only when the virtual lane boundary 30 has been breached. There are also additional proximity limits corresponding to each of the remaining virtual lane boundaries 30a,30b, such that the vehicle 10 may remain in the desired lane 32,34. And each proximity limit has a corresponding predetermined distance 36a,36b,36c, shown in FIG. 1.

In an embodiment, a "v-disparity image" is constructed of the image in FIG. 3, where it is determined that certain pixels in the image in FIG. 3 correspond to the road.

In an embodiment, a "v-disparity image" is constructed out of the disparity map generated from the image pair obtained by the stereo camera 14. The v-disparity image is created by calculating horizontal histograms for each row in the disparity map. Once the v-disparity image is available, the plane of the road 22 may be estimated, as the plane of the road 22 is projected in the v-disparity image as a straight line. To allow for this estimation, it is assumed that a significant percentage of the image pixels correspond to the plane of the road 22. Therefore, the longest line segment in the v-disparity image would correspond to the plane of the road 22. This line segment is obtained using the Hough Transform. Once the line segment is identified, the line segment may be traced back to the disparity map to identify the pixels corresponding to the road 22, and therefore the dimensions of the road 22 may be estimated and used for additional calculations. The road estimation may be strengthened by the use of additional information, such as pixel color, if available.

In one embodiment, the control device 18 is an autonomous driving (AD) controller which controls the various operating parameters of the vehicle 10. In this embodiment, the AD controller 18 not only generates the virtual lane boundary 30 (or virtual lane boundaries 30,30a,30b), but also controls various vehicle functions, such as the steering, throttle, and brakes, to maintain the minimum distance 36 from the virtual lane boundary 30, and therefore maintain the vehicle 10 in the desired virtual lane 32. Additionally, the AD controller 18 is also able to maintain the position of the vehicle 10 between the virtual lane boundaries 30,30a if it is desired to maintain the vehicle 10 in the virtual lane 32.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An apparatus, comprising:
    a lane departure system, including:
        at least one detection device mounted to a vehicle, the at least one detection device captures image data and detects objects in an environment around the vehicle and a width of a road based on the image data, the image being without any representation of lane markers or lines of the road;
        a controller in electrical communication with the at least one detection device;
        a warning device in electrical communication with the controller;
        at least one virtual lane boundary generated by the controller based on the width of the road, the image data, the objects detected in the environment around the vehicle, and a direction of travel of the vehicle, the at least one virtual lane boundary being generated without any representation of lane markers or lines of the road in the image data; and
        at least one virtual lane determined by the controller based on the at least one virtual lane boundary and located adjacent the at least one virtual lane boundary;
        wherein as the vehicle traverses the road corresponding to the at least one virtual lane, the controller sends a command to the warning device to generate a warning when the at least one detection device has detected that the vehicle had moved within a proximity limit of the road corresponding to the at least one virtual lane boundary.

2. The apparatus of claim 1, the controller further comprising an autonomous driving vehicle controller.

3. The apparatus of claim 1, the at least one virtual lane boundary further comprising a plurality of virtual lane boundaries.

4. The apparatus of claim 3, wherein a first of the plurality of virtual lane boundaries is located on one side of the at least one virtual lane, and a second of the plurality of virtual lane boundaries is located on an opposite side of the at least one virtual lane as the first of the plurality of virtual lane boundaries.

5. The apparatus of claim 1, the at least one virtual lane further comprising a plurality of virtual lanes.

6. The apparatus of claim 5, wherein a first of the plurality of virtual lanes is disposed on one side of the virtual lane boundary, and a second of the plurality of virtual lanes is disposed on an opposite side of the virtual lane boundary as the first of the plurality of virtual lanes.

7. The apparatus of claim 1, the warning further comprising at least one of a haptic, visual, or audible warning.

8. The apparatus of claim 1, wherein the proximity limit is a predefined distance away from the at least one virtual lane.

9. The apparatus of claim 1, the at least one detection device further comprising a stereo camera.

10. The apparatus of claim 1, wherein the at least one detection device comprises a stereo camera and is configured to construct a V-disparity image from the image data, estimate a plane based on the V-disparity image, identify pixels corresponding to the road and determine the width of the road based upon the identified pixels corresponding to the road.

11. The apparatus of claim 1, wherein the at least one virtual lane is inferred from the at least one virtual lane boundary.

12. A lane departure warning system, comprising:
    at least one detection device connected to a vehicle, the at least one detection device operable for generating image data and detecting objects around the vehicle and a width of a road based on the image data, the image data being without representations of lane markers and lines of the road;
    a controller in electrical communication with the at least one detection device;
    at least one virtual lane boundary generated by the controller based on the detected width of the road, the image data and a direction of travel of the vehicle on the road, the at least one virtual lane boundary being generated without any representation of lane markers or lines of the road in the image data;
    a plurality of virtual lanes based on the at least one virtual lane boundary, the at least one virtual lane boundary divides the road into the plurality of virtual lanes, such that at least one of the plurality of virtual lanes is located adjacent the at least one virtual lane boundary;
    wherein the vehicle traverses one of the plurality of virtual lanes, and the controller commands a warning device to generate a warning when the at least one detection device has detected that the vehicle has moved within a proximity limit of the at least one virtual lane boundary.

13. The lane departure warning system of claim 12, the at least one virtual lane boundary further comprising a plurality of virtual lane boundaries.

14. The lane departure warning system of claim 13, wherein each one of the plurality of virtual lane boundaries is disposed between and divides two of the plurality of virtual lanes.

15. The lane departure warning system of claim 12, the warning further comprising at least one of a haptic, visual, or audible warning.

16. The lane departure warning system of claim 12, wherein the proximity limit is a predefined distance away from the at least one virtual lane boundary.

17. The lane departure warning system of claim 12, the controller further comprising an autonomous driving vehicle controller.

18. The lane departure warning system of claim 12, the at least one detection device further comprising a stereo camera.

19. The lane departure warning system of claim 12, wherein the at least one detection device comprises a stereo camera and is configured to construct a V-disparity image from the image data, estimate a plane based on the V-disparity image, identify pixels corresponding to the road and determine the width of the road based upon the identified pixels corresponding to the road.

\* \* \* \* \*